United States Patent [19]

Spero

[11] 4,166,655
[45] Sep. 4, 1979

[54] APPARATUS FOR EQUALIZING PRESSURE AND ABSORBING SHOCK IN A PNEUMATIC BRAKING SYSTEM

[76] Inventor: Theodore P. Spero, 1751 Ellis St., Concord, Calif. 94520

[21] Appl. No.: 842,474

[22] Filed: Oct. 17, 1977

[51] Int. Cl.² .................. B60T 17/04; F16L 55/04
[52] U.S. Cl. ................................... 303/87; 138/31
[58] Field of Search ............... 303/87, 116; 138/26, 138/30, 31; 308/74

[56] References Cited

U.S. PATENT DOCUMENTS

| | | | |
|---|---|---|---|
| 3,476,450 | 11/1969 | Grange | 308/74 |
| 3,672,398 | 6/1972 | Ichiryu | 138/26 |
| 3,757,825 | 9/1973 | Givens | 138/26 |
| 3,819,235 | 6/1974 | Bowler | 303/116 |

*Primary Examiner*—Trygve M. Blix
*Assistant Examiner*—Reinhard J. Eisenzopf
*Attorney, Agent, or Firm*—Robert W. Keller

[57] ABSTRACT

Apparatus for equalizing pressure and absorbing shock to prevent single wheel lock-up in a pneumatic braking system including a pneumatic source coupled by air lines to two brake actuators and being subject to the presence of contaminants of the water droplet and particulate type, the apparatus comprising a walled housing including an inner surface forming an elongated cavity having a first port for connection to the pneumatic source and a second port for connection to one of the actuators, the cavity being configured to form a first chamber that communicates with the first and the second port and to form a second chamber, a rigid piston having a first end and an opposed second end, an elongated resiliently yieldable, shock absorbing member disposed within the cavity between the second end and an opposite wall of the cavity, the member having an outer surface and a transverse cross-sectional dimension less than the corresponding transverse cross-sectional dimension of the cavity such that the separated outer surface of the member and the inner surface of the housing form the second chamber, and a resilient covering extending from the periphery of the inner surface over the first end, the covering serving to seal the piston, member and second chamber from the contaminants, whereby an increase in pneumatic pressure in the first chamber is transmitted through the covering to the piston, causing the piston to deform the member into the second chamber.

26 Claims, 7 Drawing Figures

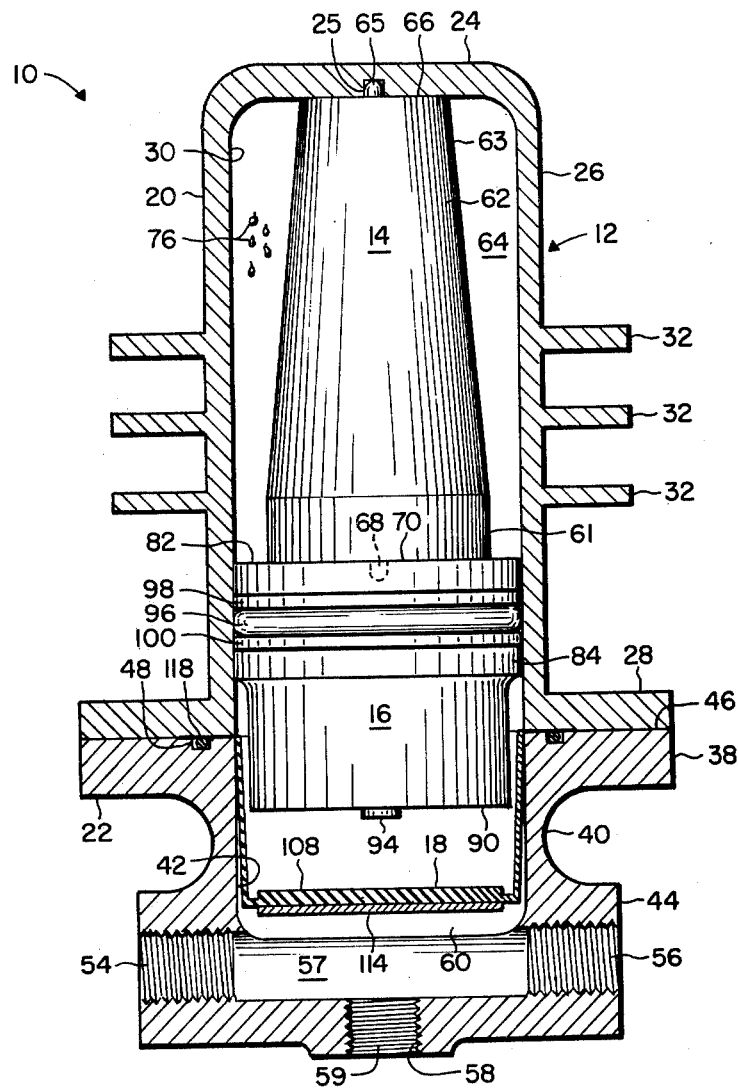
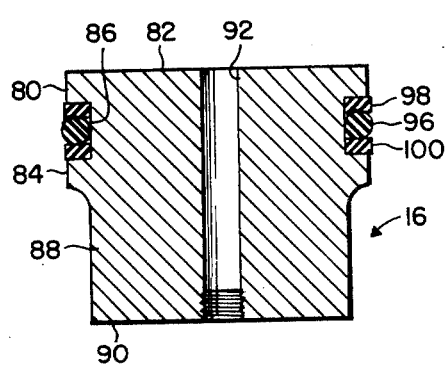
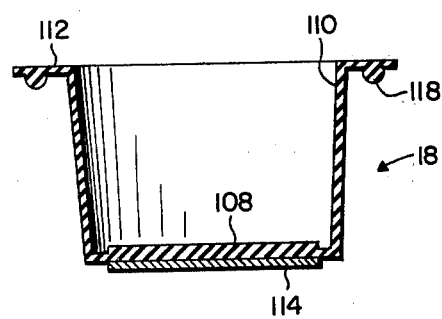
Fig. 2
Fig. 3
Fig. 4

APPARATUS FOR EQUALIZING PRESSURE AND ABSORBING SHOCK IN A PNEUMATIC BRAKING SYSTEM

BACKGROUND OF THE INVENTIONS

1. Field of the Invention

The present invention relates generally to a vehicular braking system actuated by pneumatic pressure, and more particularly, to an apparatus for equalizing pressure and absorbing shock in such a system and that employs a sealing covering to prevent water droplets and particulate contaminants which are present in the system from adversely affecting its operation.

2. Description of the Prior Art

Heretofore, apparatus for equalizing pressure and absorbing shock has not been available in pneumatic braking systems of the type commonly employed in trailer trucks and the like. In such systems the operation of one of a pair of brake actuators may be interrupted by a resistance factor which will either stop or temporarily delay its function while the other actuator proceeds to operate normally. Variations in the resistance factor can be caused by road surface conditions, variations in the air pressure in the tires, or unequal tire treads. This can cause erratic or uneven operation, or in some cases a complete malfunction of the brakes.

In a pneumatic braking system having drum-type brakes, each drum is actually an imperfect "out-of-round" circle with a so-called "high spot." Consequently, when the brakes of the truck are applied, the brake shoes pass over all high spots until the drum ultimately stops with one shoe at a high spot. Since the size and location of the high spot differs for each pair of brake assemblies, one wheel generally tends to "lock-up" before the other wheel. Should this occur the truck typically swerves or skids to one side. The problem becomes more severe in emergency situations when the brakes are applied with an increased force.

In the past it has been observed that prior to the occurrence of this lock-up condition, a shock wave of increased pressure reverberates along the air lines through which the air flows and that by absorbing or equalizing the shock wave between any pair of wheels, lock-up will not occur.

Attempts to solve this "lock-up" problem in automobiles having hydraulic brake systems are found in the U.S. Pat. No. 3,430,660, entitled "Pressure Equalizer Apparatus for Hydraulic Brake Fluid Systems" by R. E. Mitton; U.S. Pat. No. 3,757,825 entitled "Pressure Equalizing Device for Fluid Pressure Systems" by R. H. Givens and T. P. Spero, the last named being the inventor of the present invention and copending patent application Ser. No. 419,643, filed Nov. 28, 1973, entitled "Pressure Equalizing and Stabilization Device for Hydraulic Brake Systems," also invented by T. P. Spero. The device described by Mitton employs a hollow resilient bulb having a central recess and that is retained in a cavity with bulging sidewalls. Access to the recess is through a relatively small orifice. As a consequence it was found that air tends to become trapped within the recess, causing the device to react sluggishly. Another disadvantage of the Mitton device is that the hydraulic pressure is not applied uniformly to the shock-absorbing bulb so that the device does not respond in a repetitive and effective manner to variations in the hydraulic pressure. Neither that device nor the devices described in U.S. Pat. No. 3,757,825 or Ser. No. 419,643 employ a protective covering over its shock-absorbing member in a manner to seal, and hence isolate, it from external contaminants.

In this regard it has been found that devices of the type described which are used in hydraulic braking systems are not capable of operation in pneumatic braking systems. This is probably due to the presence of water droplets and particulate contaminants in the lines that couple the pneumatic power source to the air brake actuators through a release valve. More particularly, there is a decrease in temperature associated with the release and consequent expansion of air as it flows through the pneumatic braking system. Hence, even in an ambient environment that is slightly above the freezing temperature, the water droplets which form during condensation and remain in the air lines freeze as the air brakes are applied. This renders the safety braker device of the prior art inoperable in cold climates. In addition, the steel connecting air lines of pneumatic braking systems are typically filled with flakes of rust particles formed during the rusting process. Such particles have a tendency to wear the internal parts of a device inserted in the air lines, and hence make it susceptible to failure after a relatively short lifetime.

In 1975 the federal government forced the trucking industry to employ electronic computer controlled safety braker devices in the hopes of solving the wheel lock-up problem. However, such computer controlled devices are now suspected to be at fault in literally scores of accidents. Because of this a blue-ribbon advisory panel has requested that the government suspend the computer controlled anti-lock requirement.

SUMMARY OF THE PRESENT INVENTION

It is therefore a primary object of the present invention to provide an apparatus for equalizing pressure and absorbing shock which is capable of fail-safe operation in pneumatic braking systems over a relatively long lifetime.

Another object of the present invention is to provide such an apparatus which is durable, virtually maintenance free, and is relatively inexpensive.

Still another object of the present invention is to provide such an apparatus which is easy to install and which tends to reduce wear on brake shoes, brake drums and vehicle tires.

Yet another object of the present invention is to provide such an apparatus which distributes and equalizes air pressure to opposed vehicle braking wheels without adversely affecting the air pressure system commonly available on semi-trailer/truck vehicles.

Briefly, the preferred embodiment of the present invention includes a walled housing having an inner surface forming an elongated cavity with a first port for connection to a pneumatic power source and a second port for connection to one of a pair of brake actuators, the cavity being configured to form a first chamber that communicates with the first and second ports, and to form a second chamber, a rigid piston having a first end and an opposed second end, an elongated resiliently yieldable, shock absorbing member disposed within the cavity between the second end and an opposite wall of the cavity, the member having an outer surface and a transverse cross-sectional dimension less than the corresponding transverse cross-sectional dimension of the cavity such that the separated outer surface of the member and the inner surface of the housing form the second chamber, and a resilient diaphragm extending from the periphery of the inner surface over the first end, the diaphragm serving to seal the piston, member and second chamber from contaminants of the water droplet and the particulate type that are present in the pneumatic braking system, whereby an increase in pneumatic pressure in the first chamber is transmitted through the covering to the piston to deform the member into the second chamber.

An advantage of the present invention is that it provides fail-safe operation in pneumatic braking systems over a relatively long lifetime.

Another advantage of the present invention is that it is durable, virtually maintenance free and relatively inexpensive.

Still another advantage of the present invention is that it is easy to install and that it tends to reduce wear on brake shoes, brake drums, brake linings and on vehicle tires.

Yet another advantage of the present invention is that it distributes and equalizes air pressure to opposed truck braking wheels without adversely affecting the air pressure system of the truck.

These and other objects and advantages of the present invention will no doubt become apparent following a reading of the detailed description of the preferred embodiment which is illustrated in the several figures of the drawing.

IN THE DRAWING

FIG. 2 is an elevation view of the assembled apparatus illustrated in FIG. 1 with the housing and the diaphragm shown in cross-section for purposes of clarity;

FIG. 3 is a cross-sectional view of a piston;

FIG. 4 is a cross-sectional view of a diaphragm;

DETAILED DESCRIPTION OF THE PREFERRED EMBODIMENTS

Figure 1:
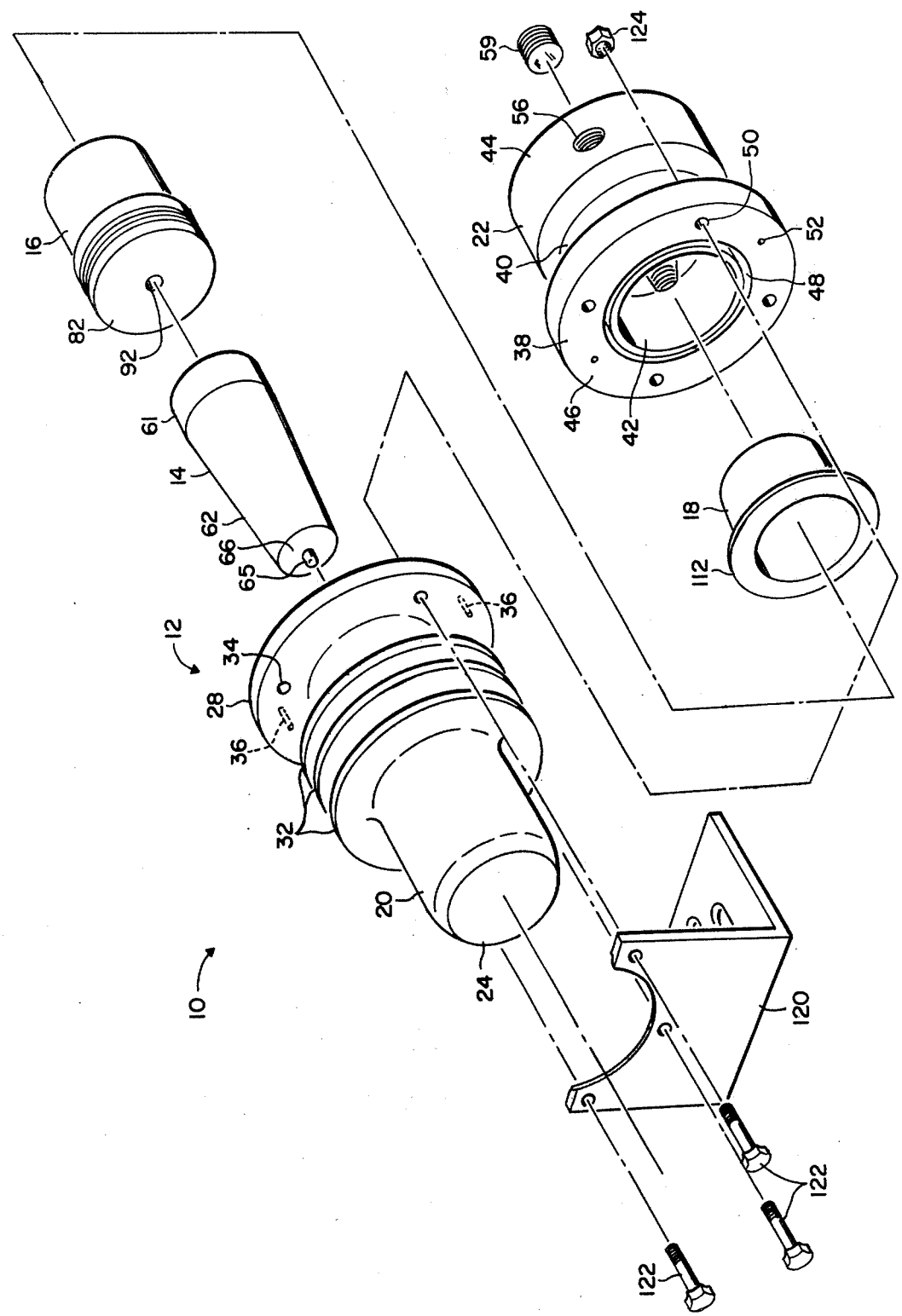
FIG. 1 is an exploded perspective view of the apparatus for equalizing pressure and absorbing shock in accordance with the present invention.

Referring now to the drawing, and more particularly to FIG. 1 thereof, an apparatus for equalizing pressure and absorbing shock, generally illustrated by the numeral 10, is illustrated in an exploded perspective view.

The apparatus 10 includes a housing 12, a shock-absorbing member 14, a piston 16 and a covering 18.

The housing 12 comprises a body 20 and a cap 22. The body 20 has a generally elongated hollow cylindrical shape with a top wall 24 having a central notch 25, a smooth side wall 26 and a flanged bottom wall 28, the top wall 24 and side wall 26 forming an inner surface 30. Protruding radially outwardly from the outer surface of the side wall 26 are three fins 32 that serve to dissipate the heat from the apparatus 10. The bottom wall 28 includes four angularly spaced-apart openings 34 and two diametrically-opposed downwardly-protruding dowel pins 36 that serve to align the cap to the body during assembly (shown in phantom).

The cap 22 has a generally squat hollow cylindrical shape with a flanged upper wall 38, a side wall 40 having an inner surface 42 with the same diameter as that of the inner surface 30, and cap portion 44. The upper wall 38 includes an upper surface 46 that is machined to mate with the corresponding surface of the bottom wall 28 and that has an annular counterbore 48 therein for receiving the lip of the covering 18 in a manner as will be subsequently described in detail. The upper wall 38 also includes four angularly spaced-apart openings 50 that are in alignment with the openings 34 and two diametrically opposed holes 52 that serve to receive the dowel pins 36 and hence align the cap and the body in a predetermined manner. The cap portion 44 includes threaded coaxial openings 54 and 56 that lie on an axis normal to the centerline through the housing and that form an inlet port and an outlet port to the interior cavity of the housing. The internal surface of the cap portion 44 contains a groove 57 so as to provide an uninterrupted path for air flowing between the inlet port and the outlet port, and also a threaded center opening 58 coaxial with the centerline through the housing that serves as a bleed valve and permits water droplets and particulate contaminants to be bled or removed from the cavity of the housing. An Allen screw 59 serves to seal the opening 58 of the bleed valve during operation of the apparatus 10. With reference also to FIG. 2 the portion of the cavity communicating with the inlet port 54 and the outlet port 56 forms a first chamber 60.

In the preferred embodiment the body has a length of 4.4 inches and an inner diameter of 2.0 inches; the cap has a length of 2.0 inches and an inner diameter of 2.0 inches; the inlet and outlet ports have a diameter of about 7/16 inches; and the body and the cap are comprised of aluminum that is painted to improve its resistance to corrosion.

The shock-absorbing member 14 has a generally cylindrical end portion 61 from which extends a tapered frustoconical portion 62 with an outer lateral surface 63 that has a transverse cross-sectional dimension which is less than that of the corresponding transverse cross-sectional dimension of the cavity such that the separated outer surface 63 and the inner surface 30 form a second chamber 64. An integral button 65 extends from the central portion of the smaller end face 66 and serves to fit into the central notch 25 such that the end face 66 abuts the top wall 24. A similar button 68 extends from the central portion of the opposed larger end face 70 and serves to engage a bore in the piston as will be subsequently described. The axially-aligned buttons 65 and 68 maintain the member 14 in a centrally oriented position within the second chamber 64 and seated against the top wall 24. This assures that a uniform amount of space will surround the member 14. The member 14 is comprised of a resilient and elastomeric material and serves to compress and hence more completely fill the second chamber 64 when a force is applied to its face 70, such force causing the member to move axially in the cavity in a direction toward the wall 24.

In the preferred embodiment the member is comprised of neoprene having a hardness that is in the range between 62 and 65 durometer. Also the second chamber 64 has a volume of about 150 cubic centimeters. It has been found that the member is fully compressed when between 80 and 90 psig is exerted on the piston 16. A quantity of oil 76 is disposed in the second chamber 64. The oil 76 serves to lubricate the member and is of the type which is incapable of penetrating the surface 63 into the body portion 62 and which is operable over the temperature range between −60° F. and 300° F. In the preferred embodiment about 10 cubic centimeters of the oil is used and the oil is one manufactured by the Mobil Oil Company and designated by them as Mobil I Oil.

The piston 16 as shown in FIG. 3 has a generally solid cylindrical shape with an end portion 80 having a face 82, an intermediate flange portion 84 separated from the portion 80 by a counterbore 86, and a recessed portion 88 terminating in a lower face 90 that is parallel to the face 82. The outer diameter of the end portion 80 and the intermediate flange portion 84 are identical and have a dimension slightly less than that of the inner surface 30 to permit a snug fit of the piston in the cavity. A central bore 92 extends between the faces 82 and 90 with its surface proximate the face 90 being threaded and adapted to receive an Allen screw 94. The bore 92 serves as an outlet for air trapped between the member 14 and the piston 16. When the piston is placed in the cavity this enables the pressures to equalize during assembly as will be subsequently described. The Allen screw 94 serves to seal the bore 92 after the pressures are equalized. The end of the bore 92 proximate the face 82 serve to receive the button 68 such that the face 82 abuts the face 70 of the member 14. As previously described, this maintains the member in a seated position even when it is not in compression.

An O-ring 96 is disposed in the counterbore 86 and serves to form an air-tight seal with the inner surface 30 when the piston is inserted into the cavity. A pair of flat annular shims 98 and 100 that are comprised of rubber material sandwich the O-ring 96 therebetween and mate with the corresponding surfaces of the portions 80 and 84, respectively. The shims 98 and 100 have been found to improve the seal between the piston and the inner surface 30 of the housing. The piston 16 serves to move axially within the cavity when a force is applied to its face 90.

Referring now to FIG. 4, the covering, or diaphragm, 18 is illustrated in a cross-sectional view. The diaphragm 18 is comprised of a resilient elastomeric material and has a shape that resembles a top hat. The diaphragm 18 includes an end wall 108, a flared side wall 110 and an annular flange 112. The end wall 108 includes a disc-like rigid plate 114 on its outer side and is reinforced with an additional dimension of resilient material on its inner surface which serves to support the plate. The plate 114 is exposed to the particulate contaminants that flow between the inlet and the outlet ports as will be subsequently described and it serves to prevent such contaminants from passing through the diaphragm and against the O-ring and shims. The end wall 108 and side wall 110 serve to seal the piston, shock absorbing member, and hence the second chamber from contaminants of either the water droplet or particulate type. The annular flange 112 includes an annular lip 118 that is adapted to engage the counterbore 48 when the diaphragm is positioned in the housing. The lip 118 serves to isolate the inner and outer portions of the flange to prevent their tearing, which would, of course, ruin the sealing effect of the diaphragm.

It has been found that the particular shape of the end and side walls enable the end wall to be depressed during operation without causing the side wall to bulge or cave in. This enhances the lifetime of the apparatus.

In the preferred embodiment, the diaphragm is comprised of butyl rubber, the plate is comprised of an aluminum disc, and the two are formed into an integral structure with an injection molding process.

A mounting bracket 120 having a generally L shape serves to mount the apparatus 10 to the underside of a trailer truck, such as to its bogey or axle. Three bolts 122 extend through the aligned openings 34 and 50 and with corresponding nuts 124, which are of the self-locking type, serve to secure the apparatus to the bracket 120. A fourth bolt 122 and nut 124 secures the remaining portion of the body and the cap.

In assembling the apparatus 10, the member 14 is inserted into the cavity with its button 65 in the notch 25 of the body 20. Next oil 76 is placed in the chamber 64. Then the piston 16 is urged into the cavity until the face 82 abuts the face 70 with the button 68 centered in the bore 92. It should be noted that in order to urge the piston into this position the opposed threaded hole of the bore must be open to allow the air that is trapped between the member and the piston to be evacuated. This enables the pressure within that region to be equalized with the ambient. Thereafter the screw 94 is threaded into the hole to seal the bore 92. It has been found that should an attempt be made to pull the piston out, the displacement changes the pressure equilibrium, and the resulting pressure differential pulls the piston back to its original position. When in this position the rubber O-ring 96 and rubber shims 98 and 100 form a seal with the inner wall 30. The shims also serve to guide the O-ring along the wall.

The diaphragm 18 is inserted into the cap 22 with its lip 118 in the annular counterbore 48 and its end wall 108 disposed slightly above the inlet port 54 and the outlet port 56. This prevents any restriction in the passageway for the air flowing through the air lines of the pneumatic braking system. Consequently, should the apparatus malfunction it will not adversely affect the pneumatic braking system. In order to assemble the cap to the body, the holes 34 and 50 and the dowel pins 36 and openings 52 are aligned and the elements are placed together. This causes the mating faces 46 and 28 to secure the flange of the diaphragm 18 therebetween. The bolts 122 and nuts 124 which extend through the aligned holes 34 and 50 serve to secure the body and cap into the housing 12 and also secure the housing 12 to the mounting bracket 120. The assembled housing is illustrated in FIG. 2.

Figure 5:
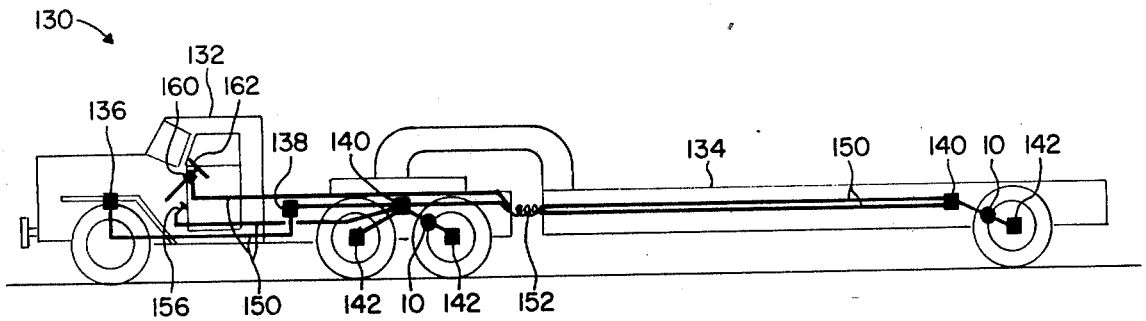
FIG. 5 is a diagramatic view of a semi trailer truck employing a pneumatic braking system utilizing the apparatus in accordance with the present invention.
Figure 6:
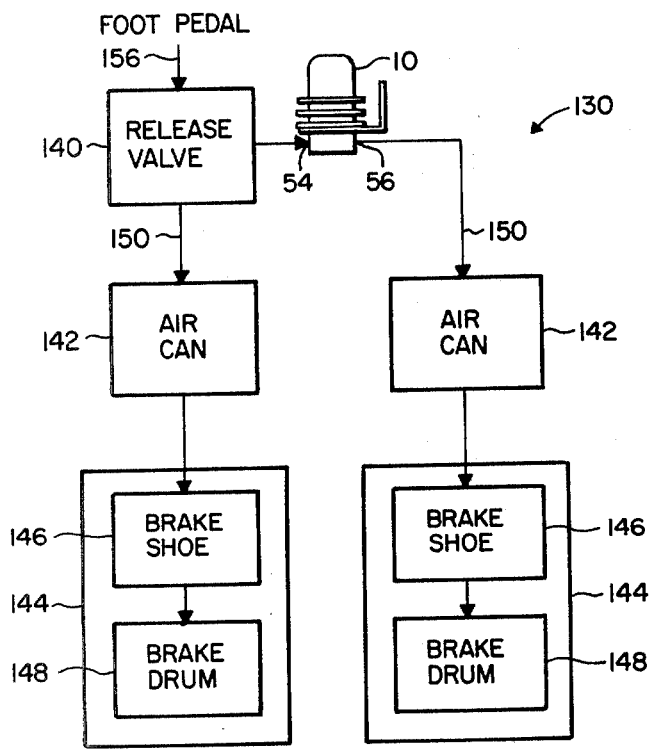
FIG. 6 is a schematic diagram of a typical pneumatic braking system utilizing the apparatus of the present invention.

Referring now to FIGS. 5 and 6, the operation of the apparatus will be described. FIG. 5 diagrammatically illustrates a pneumatic braking system 130 employing the apparatus 10 installed in a semi trailer truck 132 pulling trailer 134. The braking system 130 comprises a compressor 136 mounted on the motor of the truck, a supply tank 138, a release valve 140, the apparatus 10, air cans 142, and brake chambers 144, each comprising a brake shoe 146 and a brake drum 148 for each of the wheels of the truck. Air lines generally formed of steel interconnect the elements. A flexible air line 152 connects the air lines of the truck to those of the trailer.

The compressor 136 and supply tank 140 serves to supply air that may have maximum pressure of about 120 psig to the release valve 140. The release valve 140 serves to permit air applied to its input to pass through the valve to its air can 142 when actuated by the depression of the foot brake pedal 156 on the floor of the cab of the truck. Similarly the release valve of the trailer permits air to reach the air can 142 when actuated by the hand control actuator 160 located on the steering wheel 162. Typically each release valve is mounted to a bogey, or axle, of the trailer truck. In the preferred embodiment the release valve is manufactured by Borg Warner or Bendix-Westinghouse and designated as Model ER-4.

An input port 54 of the apparatus 10 is connected to one output of the release valve 140 via an air line, with its output port 56 being connected via an air line to one of the air cans 142. Similarly the other output of the release valve 140 is connected to an air can 142 associated with the wheel on the opposite side of the truck. As shown in the truck portion of FIG. 5 the release valve is of the four-way type and serves to control the braking of two pairs of wheels. In contrast the release valve associated with the trailer is of the two-way type and serves to control the braking of a single pair of wheels. In either case, an apparatus must be connected to a release valve in accordance with the present invention. As is well known in the art the air cans 142 include a ramming mechanism for urging the brake shoe 146 against the brake drum 148 in the brake chamber 144, and hence to stop the wheels of the truck. The compressor, supply tank, air lines, release valves, air cans and brake chambers are not shown in detail since they may be standard components readily available on pneumatic braking systems. In such a system contaminants of the water droplet or particulate type commonly reside in the air lines. In this regard it has been found that due to condensation amounts of as much as one quart of water may accumulate in a sixty day period.

In operation, the apparatus 10 operates to absorb shock and equalize pressure surges and thereby prevent a "lock-up" of either one of the wheels it controls, even when the brakes are applied with maximum force. When the brake pedal 156 is depressed, the release valve 140 is opened thereby permitting air from the pneumatic source to flow through the air lines 150 to the inlet port 54, filling the chamber 60 and depressing the covering 18. When a shock wave or pressure surge is transmitted, as occurs when a brake shoe passes over the "high spot" of a drum the pressure within the chamber 60 increases rapidly. Thus, within the chamber this pressure provides a force which depresses the covering into engagement with the face 90 and transmits the force against the piston 16. The aluminum disc 114 serves to prevent the metal contaminants from striking, and hence destroying the side walls 110 of the covering. The covering 18 serves to prevent the contaminants from reaching the O-ring and shims, and hence from reaching the chamber 64. In response to this force, the face 82 of the piston 16 bears against the larger end 70 of the resiliently yieldable member 14. As the member 14 yields and the piston moves axially, the pressure buildup within the chamber 60 is counteracted and thereby reduced back at the brake which normally would tend to "lock-up." This prevents a buildup of excessive air pressure on one of a pair of brake actuators. Movement of the piston against the member causes it to distend or deform into the chamber 64 surrounding its tapered end. It has been found that the member is entirely compressed when about 80 to 90 psi gage is exerted on the piston although at pressures of as low as 10 psig the truck is able to be stopped.

As the piston moves further the member continues to distend a greater amount while causing a fairly rapid rise in pressure in the trapped air and oil 76 within the chamber 64. The oil 76 precludes malfunction of the member over a temperature range between −60° F. and 300° F. When the air pressure builds up to the level that equals that in the upper chamber 60, the piston has reached its maximum point of travel. This occurs at a pressure which is well above that at which normal brake locks occur. Hence, a pressure equalizing apparatus that is highly sensitive to pressure changes and reacts rapidly thereto has been described.

It should be recognized that the contaminants that build up within the chamber 60 are easily removed by opening the bleed valve 59 which permits them to drop out of the apparatus under the force of gravity.

In a road test an apparatus 10 was installed on each rear assembly of a trailer truck having a gross weight of 17,900 lbs and traveling at a speed of about 50 miles per hour. When the air brakes were applied with the wheels on one side on loose gravel in the road shoulder and with the wheels on the other side on dry asphalt, approximately 16 lbs per square inch gage of air pressure were required. This compares favorably to a similar condition when 21 lbs per square inch gage of air pressure were required to stop a truck not having the apparatus. Moreover, it was noted that with the apparatus, the tendency of the truck to chatter decreased substantially.

The apparatus has been found to distribute an equalized air pressure to the pneumatic braking system of the truck within about four one-hundreths of a millisecond.

Figure 7:
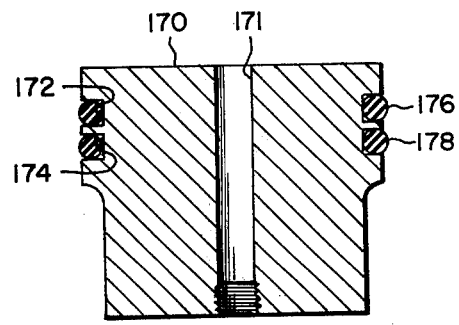
FIG. 7 is a cross-sectional view of an alternative embodiment of the piston.

In an alternative embodiment, as illustrated in FIG. 7, a piston 170 having a central bore 171 is formed with a pair of axially-spaced counterbores 172 and 174 and two O-rings 176 and 178 are inserted therein. As previously described the piston 170 responds similarly to the piston 16 and serve to move axially in the cavity to selectively compress the shock-absorbing member in response to an increase in air pressure transmitted against it.

The apparatus serves to compensate for differences in surface friction immediately when the brakes are applied by independently controlling air pressure to the wheels that are on and off the road. Moreover, even in normal braking situations, the subtle back pressure differences associated with minor surface imperfections in the road are responded to by the apparatus, thereby permitting exceptionally smooth stops with all wheels braking evenly.

From the above should be recognized that the apparatus serves to equalize pressure and absorb shock to prevent single wheel lock-up in a pneumatic braking system.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. Apparatus for equalizing pressure and absorbing shock in a braking system including a pneumatic source coupled by air lines to two brake actuators, such system being subject to the pressure of contaminants of the water droplet and particulate type, said apparatus comprising:

a walled housing including an inner surface forming an elongated cavity having a first port for connection to the pneumatic source and a second port for connection to one of the actuators;

first means disposed in said cavity to form a first chamber communicating with said first and second ports, and a second chamber, said first means including a rigid piston having a first end and an opposed second end, and an elongated resiliently yieldable, shock absorbing member disposed within said cavity, said member having an outer surface and a transverse cross-sectional dimension less than the corresponding transverse cross-sectional dimension of said cavity such that the separated outer surface of said member and inner surface of said housing form said second chamber; and second means extending from the periphery of said inner surface and over said first end, said second means serving to seal said piston, member and second chamber from the contaminants, whereby an increase in pneumatic pressure in said first chamber is transmitted through said second means to said piston, causing said piston to deform said member into said second chamber.

2. Apparatus for equalizing pressure and absorbing shock as recited in claim 1 wherein said second means includes an outer portion which is secured to said periphery of said inner surface.

3. Apparatus for equalizing pressure and absorbing shock as recited in claim 1 wherein said second means includes a central rigid portion disposed in a generally covering relationship to said first end, said rigid portion serving to shield said piston, said member and said second chamber from said contaminants, thereby tending to enhance the lifetime of said apparatus.

4. Apparatus for equalizing pressure and absorbing shock as recited in claim 3 wherein said second means further includes an outer portion secured to said periphery of said inner surface and an intermediate portion joining said outer portion to said rigid portion.

5. Apparatus for equalizing pressure and absorbing shock as recited in claim 4 wherein said outer portion and said intermediate portion are formed from a resilient material.

6. Apparatus for equalizing pressure and absorbing shock as recited in claim 5 wherein said rigid portion includes reinforcing means formed of a resilient material to enhance its wear characteristics.

7. Apparatus for equalizing pressure and absorbing shock as recited in claim 5 wherein said outer portion, said intermediate portion and said rigid portion are integrally formed by an injection molding process.

8. Apparatus for equalizing pressure and absorbing shock as recited in claim 1 wherein said second means is formed from a resilient material and has a shape that resembles a top hat.

9. Apparatus for equalizing pressure and absorbing shock as recited in claim 1 wherein said housing includes a body having a flanged end and a cap having a flanged end, and said second means includes an outer portion, said flanged ends serving to secure said outer portion such that said second means is arranged in a sealing relationship with said housing and serves to prevent contaminants from reaching said piston, said member and said second chamber.

10. Apparatus for equalizing pressure and absorbing shock as recited in claim 9 wherein said flanged end of said cap includes a counterbore and said outer portion includes a protruding lip that is adapted to snugly fit within said counterbore and means for securing said cap to said body, said lip serving to isolate the said second means from torque forces that have a tendency to tear said second means.

11. Apparatus for equalizing pressure and absorbing shock as recited in claim 9 wherein a first one of said flanged ends includes a pair of diammetrically opposed openings and a second of said flanged ends includes a pair of dowel pins disposed to engage and hence align said cap and said body in a predetermined relationship.

12. Apparatus for equalizing pressure and absorbing shock as recited in claim 1 wherein said piston includes a central bore extending axially between said first and second ends, said bore serving to permit the air that is trapped between said shock absorbing member and said second end to be evacuated, and third means for covering the opening of said bore on said first face after evacuation.

13. Apparatus for equalizing pressure and absorbing shock as recited in claim 1 and further comprising fourth means for mounting said apparatus to the axle of a truck with the end of said housing having said first and second ports being proximate the roadway.

14. Apparatus for equalizing pressure and absorbing shock as recited in claim 1 wherein said piston includes an annular groove spaced from its first end, and an O-ring disposed in said groove to provide a seal between said piston and said housing.

15. Apparatus for equalizing pressure and absorbing shock as recited in claim 1 wherein said piston includes a pair of spaced-apart annular grooves spaced from said first end, and a pair of O-rings disposed in said grooves to provide a seal between said piston and said housing.

16. Apparatus for equalizing pressure and absorbing shock as recited in claim 1 and further comprising oil within said second chamber for lubricating said member and for improving its capability to withstand high and low temperatures.

17. Apparatus for equalizing pressure and absorbing shock in a braking system including a pneumatic source coupled by air lines to two brake actuators, such system being subject to the presence of contaminants of the water droplet and particulate type, said apparatus comprising:
  a walled housing including an inner surface forming an elongated cavity having a first port for connection to the pneumatic source and a second port for connection to one of the actuators;
  a rigid piston being disposed in said cavity and having a first end facing toward said ports and a second end;
  an elongated resiliently yieldable, shock absorbing member disposed within said cavity between said second end and an opposite wall of said cavity, said member having an outer surface that is separated from said inner surface of said housing such that said separated surfaces form a chamber; and
  diaphragm means extending from the periphery of said inner surface and over said first end, said diaphragm means serving to cover said piston, said member and said chamber and hence seal such elements from the contaminants, whereby an increase in pneumatic pressure on said diaphragm means forces it into contact with said first end such that the pressure is transmitted to said piston, causing said piston to deform said member into said chamber.

18. Apparatus for equalizing pressure and absorbing shock as recited in claim 17 wherein said diaphragm means includes an outer portion which is secured to said periphery of said inner surface.

19. Apparatus for equalizing pressure and absorbing shock as recited in claim 17 wherein said diaphragm means includes a central rigid portion disposed in a generally covering relationship to said first end and serving to shield said piston, said member and said chamber from said contaminants.

20. Apparatus for equalizing pressure and absorbing shock as recited in claim 19 and wherein said diaphragm means is formed from a resilient material and further includes an outer portion secured to said periphery of said inner surface and an intermediate portion joining said outer portion to said rigid portion.

21. Apparatus for equalizing pressure and absorbing shock as recited in claim 20 wherein said rigid portion includes reinforcing means to enhance its capability to withstand wear and said outer portion, said intermediate portion and said rigid portion being an integral structure formed by injection molding.

22. Apparatus for equalizing pressure and absorbing shock as recited in claim 17 wherein said housing includes an elongated body having a flanged end and a cap having a flanged end, and said diaphragm means includes an outer portion, said flanged ends serving to secure said outer portion such that said diaphragm means is arranged in a sealing relationship with said housing and serves to prevent contaminants from reaching said piston, said member and said chamber.

23. Apparatus for equalizing pressure and absorbing shock as recited in claim 22 wherein said flanged end of said cap includes a counterbore and said outer portion includes a protruding lip that is adapted to snugly fit within said counterbore and further including means for securing said cap to said body, said lip serving to isolate said diaphragm means from torque forces that have a tendency to tear said diaphragm means.

24. Apparatus for equalizing pressure and absorbing shock as recited in claim 17 wherein said piston includes a central bore extending axially between said first and second ends, said bore serving to permit the air that is trapped between said shock absorbing member and said second end to be released, and further comprising means for selectively covering the opening of said bore on said first face.

25. Apparatus for equalizing pressure and absorbing shock as recited in claim 17 wherein said piston includes an annular groove spaced from its first end, and an O-ring disposed in said groove to provide a seal between said piston and said housing.

26. Apparatus for equalizing pressure and absorbing shock in a braking system including a pneumatic source coupled by air lines to two brake actuators, such system being subject to the presence of contaminants of the water droplet and particulate type, said apparatus comprising:
 a walled housing including an inner surface forming an elongated cavity having a first port for connection to the pneumatic source and a second port for connection to one of the actuators;
 means disposed in said cavity and having a first end facing toward said ports, a second end abutting an opposite wall of said cavity, and an outer surface including a first portion proximate said first end that is in a generally sealing relationship with said inner surface of said housing and a second portion proximate said second end that is separated from said inner surface such that said separated surfaces form a chamber, said second portion being capable of resiliently deforming into said chamber when a pressure is exerted on said first end; and
 diaphragm means being formed of a resilient material and extending from the periphery of said inner surface and over said first end in a covering relationship to said means disposed in said cavity so as to seal it from the contaminants, whereby an increase in pneumatic pressure on said diaphragm means forces it into contact with said first end such that the pressure is transmitted to said means disposed in said cavity, causing said second portion to deform into said chamber.

* * * * *